United States Patent
Rajput et al.

(10) Patent No.: US 11,528,338 B2
(45) Date of Patent: Dec. 13, 2022

(54) METHODS, SYSTEMS, AND COMPUTER READABLE MEDIA FOR PROVIDING FOR RELIABLE SERVICE BASED INTERFACE (SBI) MESSAGE TRANSPORT USING ZERO EVENT NOTIFICATION MESSAGES

(71) Applicant: Oracle International Corporation, Redwood Shores, CA (US)

(72) Inventors: Jay Rajput, Bangalore (IN); Virendra Singh, Bangalore (IN); Sairam Sudhir Pokkunuri, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/192,790

(22) Filed: Mar. 4, 2021

(65) Prior Publication Data

US 2022/0286518 A1  Sep. 8, 2022

(51) Int. Cl.
*H04L 67/55* (2022.01)
*H04L 41/0654* (2022.01)
(Continued)

(52) U.S. Cl.
CPC .......... *H04L 67/55* (2022.05); *H04L 41/0672* (2013.01); *H04L 67/51* (2022.05); *H04L 69/40* (2013.01); *H04W 4/06* (2013.01)

(58) Field of Classification Search
CPC ..... H04L 67/26; H04L 41/0672; H04L 67/16; H04L 69/40; H04W 4/06
See application file for complete search history.

(56) References Cited

U.S. PATENT DOCUMENTS

2021/0258406 A1* 8/2021 Ali ...................... H04W 60/005

FOREIGN PATENT DOCUMENTS

WO   WO-2021160547 A1 * 8/2021

OTHER PUBLICATIONS

"3rd Generation Partnership Project; Technical Specification Group Core Network and Terminals; 5G System; Principles and Guidelines for Services Definition; Stage 3 (Release 17)," 3GPP TS 29.501, V17.0.0, pp. 1-75 (Dec. 2020).

(Continued)

*Primary Examiner* — Patrice L Winder
*Assistant Examiner* — Angela M Widhalm De Rodriguez
(74) *Attorney, Agent, or Firm* — Jenkins, Wilson, Taylor & Hunt, P.A.

(57) ABSTRACT

A method for providing for reliable service based interface (SBI) message transport using zero event notifications includes, at a consumer NF, sending an SBI message to a producer NF indicating an intent to use zero event notification messaging. The method further includes, at the producer NF, receiving the SBI message indicating the intent to use zero event notification messaging, and, transmitting a zero event notification request message to the consumer NF using a callback URI from the SBI message to confirm the callback URI and connectivity from the producer NF to the consumer NF. The method further includes, at the consumer NF, receiving the zero event notification request message and, in response, sending a zero event notification response message to the producer NF. The method further includes, at the producer NF, receiving the zero event notification response message, and, in response, continuing SBI subscription messaging with the consumer NF.

18 Claims, 9 Drawing Sheets

(51) Int. Cl.
*H04W 4/06* (2009.01)
*H04L 69/40* (2022.01)
*H04L 67/51* (2022.01)

(56) References Cited

OTHER PUBLICATIONS

"3rd Generation Partnership Project; Technical Specification Group Services and System Aspects; System architecture for the 5G System (5GS); Stage 2 (Release 16)," 3GPP TS 23.501, V16.7.0, pp. 1-420 (Dec. 2020).

"3rd Generation Partnership Project; Technical Specification Group Services and System Aspects; Procedures for the 5G System (5GS); Stage 2 (Release 16)," 3GPP TS 23.502, V16.7.1, pp. 1-522 (Jan. 2021).

"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).

\* cited by examiner

METHODS, SYSTEMS, AND COMPUTER READABLE MEDIA FOR PROVIDING FOR RELIABLE SERVICE BASED INTERFACE (SBI) MESSAGE TRANSPORT USING ZERO EVENT NOTIFICATION MESSAGES

TECHNICAL FIELD

The subject matter described herein relates to providing for reliable message transport in communications networks. More particularly, the subject matter described herein relates to methods, systems, and computer readable media for reliable SBI message transport using zero event notification messages.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and the SCP load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks is that subscription related messaging that takes place on the SBI interface can be unreliable. The SBI interface is an HTTP interface used to communicate messages between 5G NFs. One type of communications that occurs over the SBI interface is subscribe/notify communications. In a typical subscribe/notify communications procedure, a consumer NF requests creation of a subscription with the producer NF. If the producer NF accepts the subscription, the producer NF responds to the consumer NF indicating that the subscription has been created. When the condition that triggers a notification associated with the subscription occurs, the producer NF transmits a notification message to the consumer NF over the SBI interface.

The notification message transmitted over the SBI interface includes a callback uniform resource identifier (URI) that is supposed to identify the sending consumer NF. If the callback URI provided in the subscription request message is incorrect or if there is a transport failure between the consumer NF and the producer NF, the producer NF will be unable to transmit notification messages successfully to the consumer NF. If the notification is not successful, excessive delay in processing may result because the consumer NF is required to discover the failure, recreate the subscription with the producer NF, and subsequently receive the notifications.

In light of these and other difficulties, there exists a need for methods, systems, and computer readable media for providing improved reliability for subscription-related messages transmitted over the SBI interface.

SUMMARY

A method for providing for reliable service based interface (SBI) message transport using zero event notifications includes, at a consumer NF, sending an SBI message to a producer NF indicating an intent to use zero event notification messaging. The method further includes, at the producer NF, receiving the SBI message indicating the intent to use zero event notification messaging, and, transmitting a zero event notification request message to the consumer NF using a callback uniform resource identifier (URI) from the SBI message to confirm the callback URI and connectivity from the producer NF to the consumer NF. The method further includes, at the consumer NF, receiving the zero event notification request message and, in response, sending a zero event notification response message to the producer NF. The method further includes, at the producer NF, receiving the zero event notification response message, and, in response, continuing SBI subscription messaging with the consumer NF.

According to another aspect of the subject matter described herein, sending the SBI message indicating an intent to use zero event notification messaging includes transmitting a hypertext transfer protocol (HTTP) message to the producer NF and including a parameter in a header of the HTTP message that indicates the intent to use zero event notification messaging and a timing as to when to use the zero event notification messaging.

According to another aspect of the subject matter described herein, the HTTP header indicates that the zero event notification messaging will be during or after subscription creation.

According to another aspect of the subject matter described herein, transmitting the zero event notification request message includes transmitting the zero event notification request message as a part of creation of a subscription.

According to another aspect of the subject matter described herein, transmitting the zero event notification request message as part of creation of a subscription includes transmitting the zero event notification request message after receiving a subscription request from the consumer NF and wherein continuing the SBI subscription messaging with the consumer NF includes transmitting a subscription response to the consumer NF indicating successful creation of a subscription.

According to another aspect of the subject matter described herein, transmitting the zero event notification request message includes transmitting the zero event notification request message after creation of a subscription.

According to another aspect of the subject matter described herein, transmitting the zero event notification request message after creation of a subscription includes transmitting the zero event notification request message after transmitting a subscription response message to the consumer NF indicating successful creation of the subscription.

According to another aspect of the subject matter described herein, transmitting the zero event notification request message includes transmitting the zero event notification request message as part of updating a subscription.

According to another aspect of the subject matter described herein, transmitting the zero event notification request message includes transmitting the zero event notification request message after updating a subscription.

According to another aspect of the subject matter described herein, the zero event notification request message comprises a dummy event notification message that does not correspond to a subscription event.

According to another aspect of the subject matter described herein, a system for providing for reliable service based interface (SBI) message transport using zero event notifications is provided. The system includes a consumer NF including at least one processor and a memory for sending an SBI message indicating an intent to use zero event notification messaging. The system further includes a producer NF including at least one processor and a memory for receiving the SBI message indicating the intent to use zero event notification messaging, and, in response, for transmitting a zero event notification request message to the consumer NF using a callback uniform resource identifier (URI) from the SBI message to confirm the callback URI and connectivity from the producer NF to the consumer NF. The consumer NF is configured to receive the zero event notification request message and, in response, send a zero event notification response message to the producer NF. The producer NF is configured to receive the zero event notification response message, and, in response, continue with SBI subscription messaging with the consumer NF.

According to another aspect of the subject matter described herein, the consumer NF is configured to send the SBI message indicating an intent to use zero event notification messaging by transmitting a hypertext transfer protocol (HTTP) message to the producer NF and including a parameter in a header of the HTTP message that indicates the intent to use zero event notification messaging and a timing as to when to use the zero event notification messaging.

According to another aspect of the subject matter described herein, the HTTP header indicates that the zero event notification messaging will be during or after subscription creation.

According to another aspect of the subject matter described herein, the producer NF is configured to transmit the zero event notification request message as a part of creation of a subscription.

According to another aspect of the subject matter described herein, the producer NF is configured to transmit the zero event notification request message after receiving a subscription request from the consumer NF and to continue the SBI subscription messaging with the consumer NF by transmitting a subscription response to the consumer NF indicating successful creation of a subscription.

According to another aspect of the subject matter described herein, the producer NF is configured to transmit the zero event notification request message after transmitting a subscription response message to the consumer NF indicating successful creation of the subscription.

According to another aspect of the subject matter described herein, the producer NF is configured to transmit the zero event notification request message as part of updating a subscription.

According to another aspect of the subject matter described herein, the producer NF is configured to transmit the zero event notification request message after updating a subscription.

According to another aspect of the subject matter described herein, a non-transitory computer readable medium having stored thereon executable instructions that when executed by a processor of a computer control the computer to perform steps comprising is provided. The steps include, at a consumer network function (NF), sending a service based interface (SBI) message to a producer NF indicating an intent to use zero event notification messaging. The steps further include, at the producer NF, receiving the SBI message indicating the intent to use zero event notification messaging, and, transmitting a zero event notification request message to the consumer NF using a callback uniform resource identifier (URI) from the SBI message to confirm the callback URI and connectivity from the producer NF to the consumer NF. The steps further include, at the consumer NF, receiving the zero event notification request message and, in response, sending a zero event notification response message to the producer NF. The steps further include, at the producer NF, receiving the zero event notification response message, and, in response, continuing SBI subscription messaging with the consumer NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
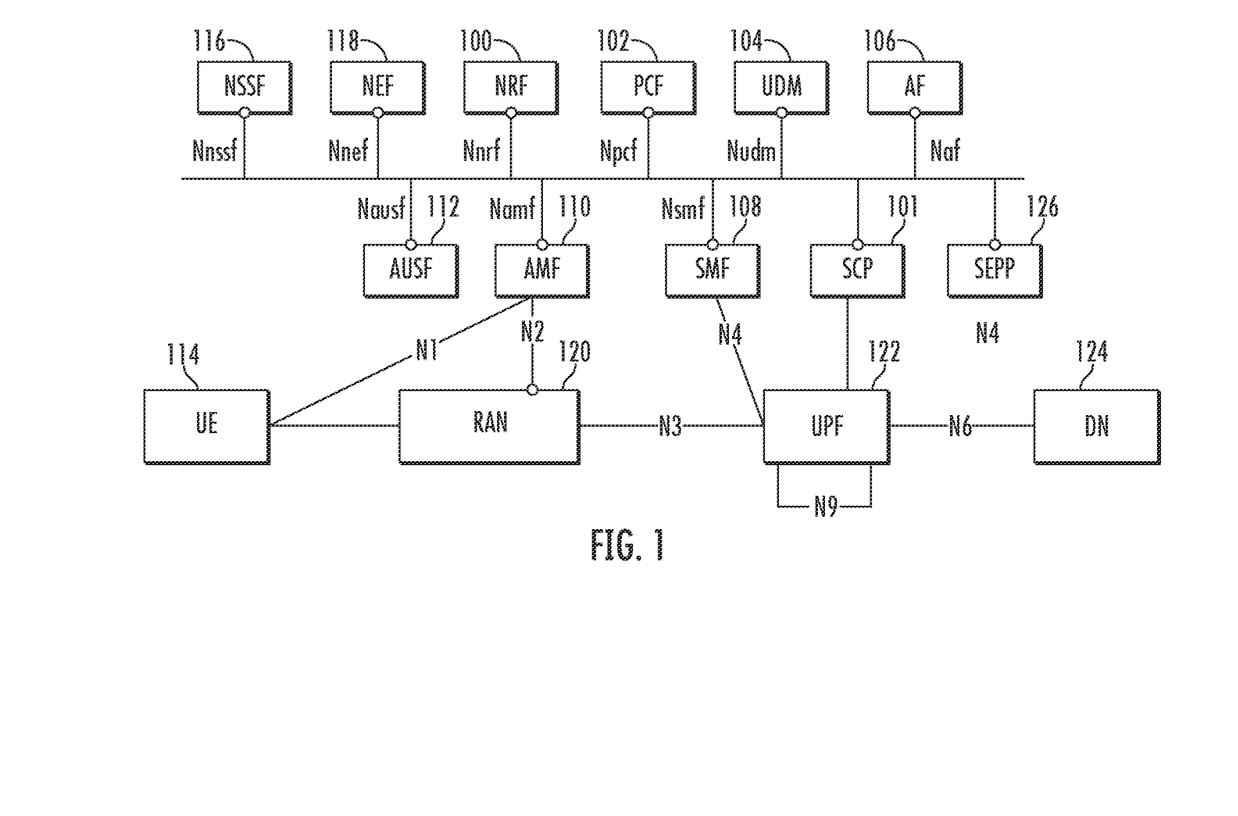
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a PCF 102 that performs policy related operations in a network, a UDM function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

As described above, one problem with the 3GPP network architecture for 5G networks is that notifications from a producer NF to a consumer NF relating to an existing a subscription may fail due to a number of reasons, including an invalid callback URI in a subscription request message, a transport failure between the consumer NF and the producer NF, firewall misconfigurations, etc. It is desirable to identify such errors rapidly so that notification messages can be delivered with increased reliability. Identifying invalid callback URIs and lack of connectivity from a producer NF to a consumer NF should be performed using a mechanism that is easy to implement at the NF service consumer and the NF service producer and that results in rapid error identification so that appropriate corrective action can be taken.

Figure 2A:
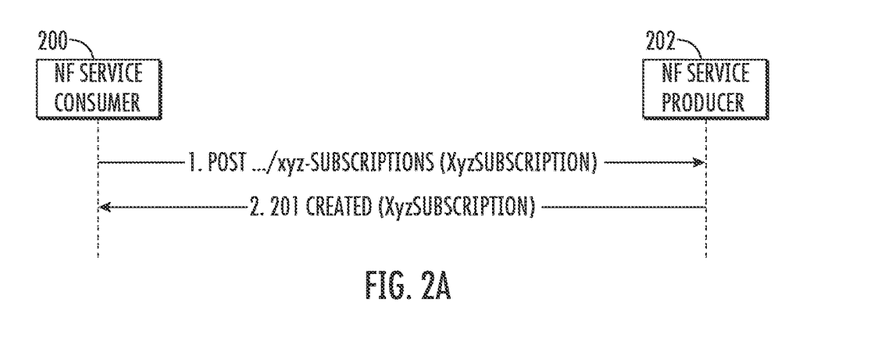
FIG. 2A is a message flow diagram illustrating exemplary messages exchanged for creating a subscription on the SBI interface.

FIG. 2A is a message flow diagram illustrating an NF service consumer creating a subscription with an NF service producer over the SBI interface using the HTTP POST method. Referring to FIG. 2A, in line 1, NF service consumer 200 sends a subscription request carried in an HTTP POST message to NF service producer 202. The subscription request message identifies a subscription being created and includes a callback URI for sending notifications to NF service consumer 200. In response to the subscription request message, in line 2, NF service producer 202 creates the requested subscription and responds to the subscription request message with a subscription response message, which in the illustrated example is an HTTP 201 Created message, indicating that the subscription has been created. It should be noted that once a subscription is created, there is no mechanism for verifying the callback URI in the subscription request or connectivity from the producer NF to the consumer NF prior to sending a notification message to the consumer NF.

Figure 2B:
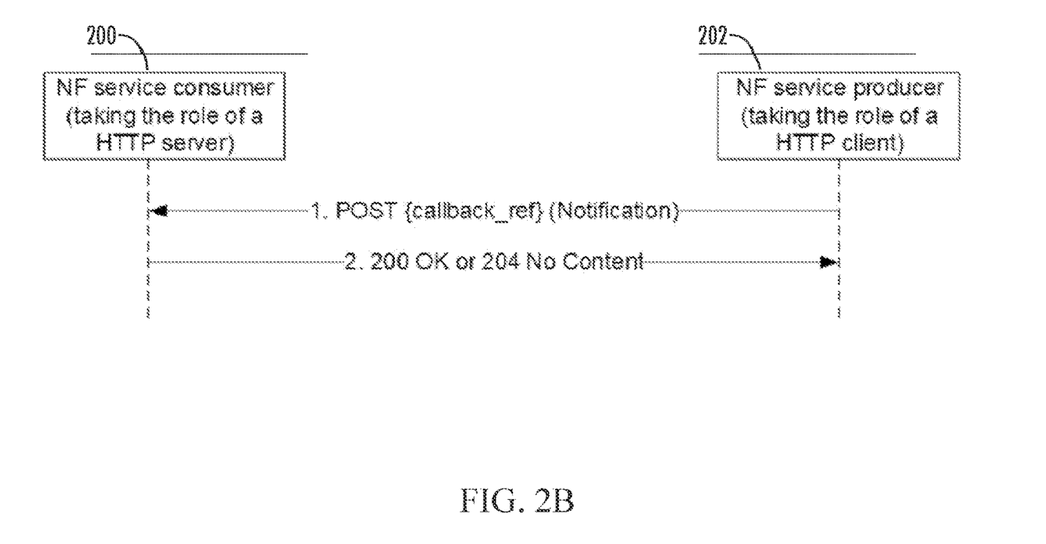
FIG. 2B is a message flow diagram illustrating exemplary message exchanged for Sending a notification message relating to an existing subscription.

FIG. 2B illustrates the use of the HTTP POST method to send a notification regarding an existing subscription to a consumer NF. Referring to FIG. 2B, in line 1 of the message flow diagram, NF service producer 202 sends an HTTP POST message to NF service consumer 200 containing a notification triggered by a condition specified in an existing subscription. The notification message is sent to the callback URI in the subscription request message. In line 2, NF service consumer 200 responds with a 200 OK or 204 No Content message, depending on whether the POST operation was successful. If the callback URI in the subscription request is invalid or there is a lack of connectivity from the NF service producer to the NF service consumer, the NF service consumer will not receive the notification message in FIG. 2B, and there is no feedback mechanism for increasing reliability of delivering the notification message.

One problem with the subscription procedure illustrated in FIGS. 2A and 2B is that the delivery of the notification message illustrated in FIG. 2B can fail and there is no mechanism for reducing the likelihood of failure to successfully deliver the notification message prior to transmitting the notification message. As indicated above, notification messages can fail because of a bad callback URI, a transport failure arising because of a transport layer security misconfiguration, a security failure because of a firewall rule misconfiguration, or other mechanism. An out-of-band procedure is needed to make sure that an NF service producer can notify the NF service consumer successfully. The out-of-band procedure becomes complex when the same operator does not own both the NF service consumer or the NF service producer, for example, in the case of a mobile network operator-mobile virtual network operator (MNO-MVNO) interaction and roaming scenarios. A feedback mechanism is needed to tell both the service producer and the service consumer about the inability of the service producer to send the notification message. In one implementation described herein, the feedback mechanism occurs prior to transmitting a notification message triggered by a condition associated with a subscription through the exchange of zero event notification request and response messages from the NF service producer to the NF service consumer.

Figure 3:
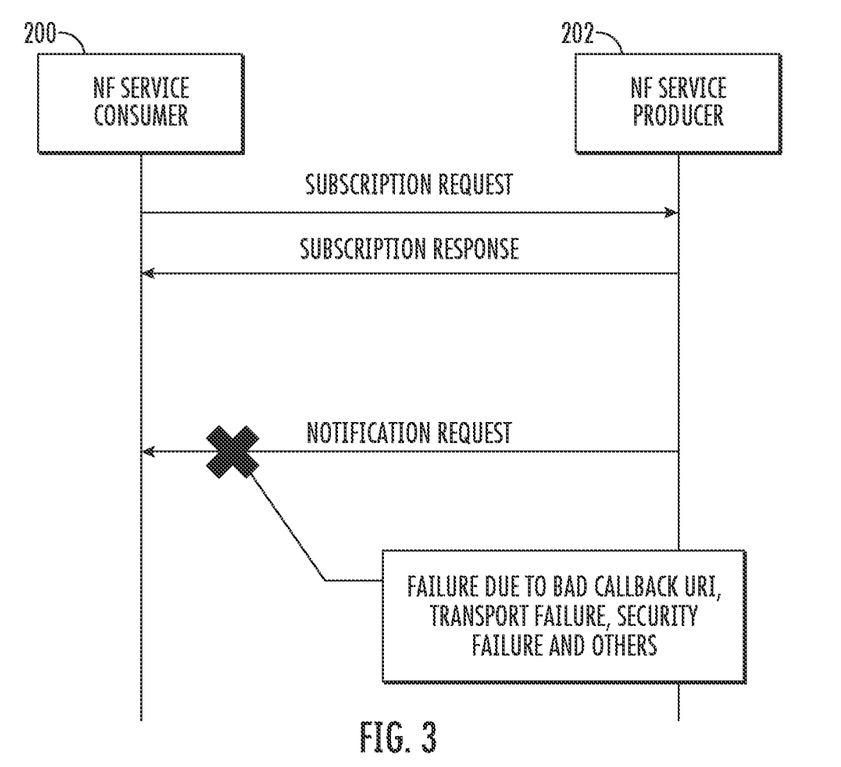
FIG. 3 is a message flow diagram illustrating exemplary messages exchanged for creating a subscription and transmitting a notification message where the notification message is not successfully delivered to the consumer NF.

FIG. 3 illustrates the problem that can occur when a notification fails. Referring to FIG. 3, in line 1 of the message flow diagram, NF service consumer 200 sends a subscription request message to NF service producer 202. In line 2 of the message flow diagram, NF service producer 202 sends a subscription response to NF service consumer 200 indicating that the subscription was successfully created. In line 3 of the message flow diagram, when the notification condition associated with the subscription is triggered, NF service producer 202 sends a notification request message to NF service consumer 200. However, delivery of the notification request fails, for example, due to any of the causes described above. When this occurs, NF service consumer 200 is required to detect the failure and correct or attempt to correct the issue that caused the failure and possibly recreate the subscription. Detecting the failure may be difficult, because NF service consumer 200 doesn't know that the notification message was transmitted. Stated differently, it is difficult for a receiver (in this case the NF service consumer) to detect failed transmission of a notification message that the NF service consumer did not receive.

In light of these difficulties, the subject matter described herein includes a procedure for zero event notification where NF service producer 202 sends a zero event notification request message to NF service consumer 200 to confirm the availability of NF service consumer 200 to receive a notification message relating to a subscription, and NF service consumer 200, in response to the zero event notification request message, transmits a zero event notification response message to NF service producer 202. As used herein, the term "zero event notification request message" refers to a dummy notification request message that is not triggered by a notification event and is used by the NF service producer to verify that the callback URI in a subscription request is valid and that connectivity with the consumer NF is available. The term "zero event notification response message" refers to a dummy notification response message that confirms receipt of the zero event notification request message.

Figure 4:
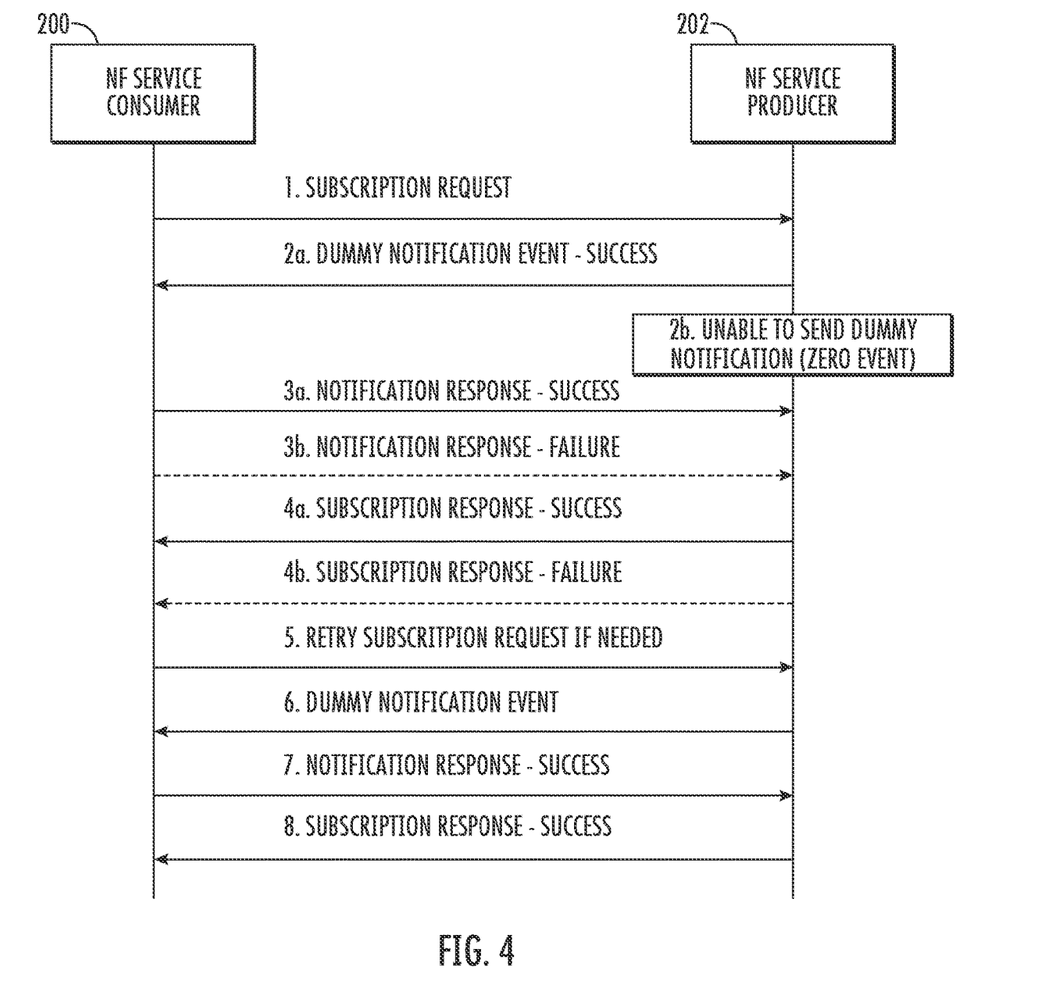
FIG. 4 is a message flow diagram illustrating an exemplary process for zero event notification as part of a new subscription.

FIG. 4 is a message flow diagram illustrating the use of the zero event notification message procedure as part of a new subscription to verify a callback URI and confirm connectivity with a consumer NF. Referring to the message flow in FIG. 4, in line 1, NF service consumer 200 sends a subscription request message to NF service producer 202. The subscription request message includes an identifier for the subscription, a callback URI, and a parameter that indicates the intent to use zero event notification as part of the subscription creation procedure. The parameter that indicates the usage of zero event notification as part of the subscription creation procedure may be carried as a new parameter in an HTTP header of the subscription request message.

In line 2 of the message flow diagram, NF service producer 202 sends a zero event notification request message using the callback URI from the subscription request and sends the message to NF service consumer 200 to verify the callback URI and connectivity from NF service producer 202 to the NF service consumer 202. If the zero event notification request message is successfully received, control proceeds to line 3a where NF service consumer 200 sends a zero event notification response message to NF service producer 202 indicating successful receipt of the zero event notification request message. Control then proceeds to line 4a where NF service consumer 202 sends a subscription response message to NF service consumer 200 indicating successful creation of the subscription. Thus, lines 1, 2a, 3a, and 4a of FIG. 4 illustrate the use of the zero event notification procedure to confirm or verify the callback URI and connectivity with NF service consumer 200 to receive notification messages where the zero event notification procedure is performed as part of the subscription creation procedure.

Referring to step 2B in FIG. 4, if NF service producer 202 is unable to send the zero event notification request message, control proceeds to line 4b, where NF service producer 202 sends a subscription response message indicating failure to establish a subscription. Control then proceeds to line 5 where NF service consumer 200 retries the subscription request after correcting the cause of the previous subscription failure. In line 6, NF service producer 202 sends a zero event notification request message to NF service consumer 200. In line 7, NF service consumer 200 sends a zero event notification response to NF service producer 202. In line 8, NF service producer 202 sends a subscription response to NF service consumer 200 indicating successful creation of the subscription. Thus, FIG. 4 illustrates the use of the zero event notification procedure to verify the callback URI and connectivity of the consumer NF to receive a subscription response message and subsequent notifications as part of establishment of a new subscription.

Figure 5:
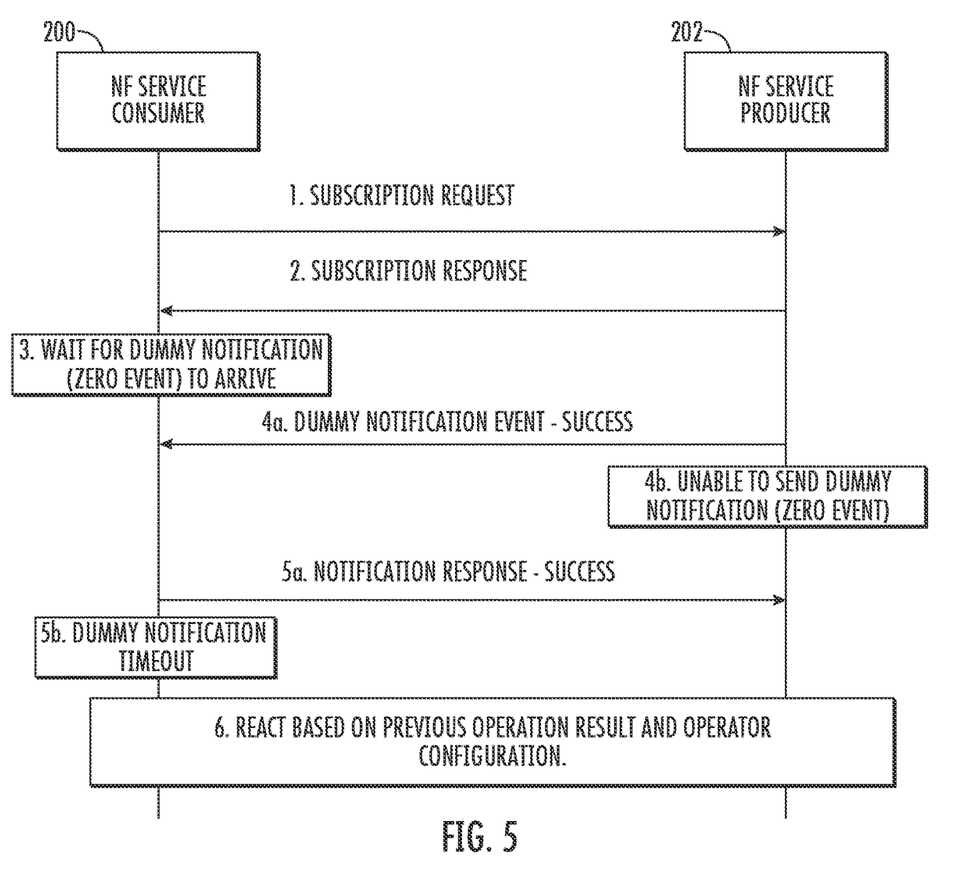
FIG. 5 is a message flow diagram illustrating exemplary messages exchanged for zero event notification after a new subscription.

In an alternate implementation, the zero event notification procedure may be used to confirm the callback URI and connectivity with the NF service consumer to receive notification messages after creation of a new subscription. This scenario is illustrated in FIG. 5. Referring to FIG. 5, in line 1, NF service consumer 200 sends a subscription request to NF service producer 202. The subscription request indicates or carries a parameter indicating an intent to use zero event notification after subscription creation. In line 2 of the message flow diagram, NF service producer 202 sends a subscription response message to NF service consumer 200 confirming creation of the subscription. In step 3, NF service consumer 200 waits for the dummy or zero event notification request message to arrive and, based on an operator configuration, generates an alert if the zero event notification request message does not arrive within a configured time, as indicated by the dummy notification timeout in step 5b. Assuming NF service producer 202 is able to send the zero event notification request message, control proceeds to step 4a, where NF service producer 202 sends the zero event notification request message to NF service consumer 200. If NF service consumer 200 successfully receives and accepts the zero event notification request message, control proceeds to line 5a where NF service consumer 200 sends a zero event notification response message to NF service producer 202 indicating successful receipt of the zero event notification request message. After line 5a, the zero event notification procedure ends, and subscription-related communications can then proceed as normal between NF service consumer 200 and NF service producer 202. For example, if an event occurs that triggers a notification, NF service producer 202 can send a notification message regarding the event to NF service consumer 200. Because the zero event notification message exchange was successful, NF service producer 202 may have a higher degree of confidence that the notification message will be successfully received than if the zero event notification request and response message exchange had not successfully occurred.

Referring to step 4b in FIG. 5, if NF service producer 202 is unable to send the zero event notification request message, the dummy notification timeout in step 5b occurs, and control proceeds to step 6 where NF service consumer 200 and NF service producer 202 react based on the operation result and operator configuration. For example, NF service consumer 200 may delete the subscription, attempt to re-establish the subscription, and reset the timer for waiting for the zero event notification request message after the new subscription is established. Thus, FIG. 5 illustrates the case of using the zero event notification procedure to confirm a callback URI and connectivity with an NF service consumer to receive notification messages after establishment of a subscription.

Figure 6:
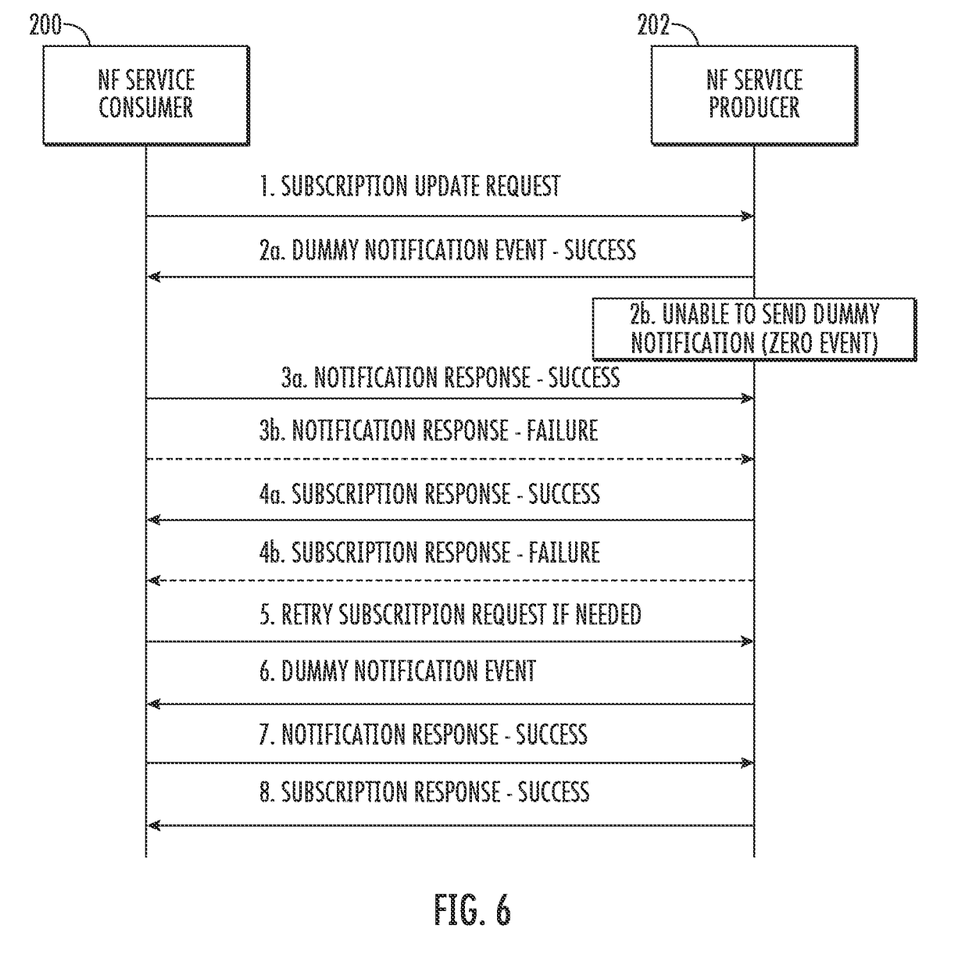
FIG. 6 is a message flow diagram illustrating exemplary messages exchanged for zero event notification as part of a subscription update.

In an alternate implementation of the subject matter described herein, the zero event notification procedure may be implemented as part of a subscription update. Such an implementation is illustrated in FIG. 6. Referring to FIG. 6, in line 1 of the message flow diagram, NF service consumer 200 sends a subscription update request message to NF service producer 202. The subscription update request message may be an HTTP PUT or PATCH message relating to an existing subscription. The subscription update request message may include a parameter in a header of the message indicating the intent to use zero event notification as part of the subscription update procedure. In step 2a, NF service producer 202 sends a zero event notification request message to NF service consumer 200 using the callback URI from the subscription update request to verify the callback URI and connectivity from the NF service producer to the NF service consumer. If the subscription update request message in line 1 includes an updated callback URI, then NF service producer 202 uses the updated callback URI in the zero event notification request message. If NF service consumer 200 successfully receives the zero event notification request message, NF service consumer 200 responds in line 3a by sending a zero event notification response message to NF service producer 202 indicating successful completion of the zero event notification procedure. After step 3a, control proceeds to step 4a where NF service producer 202 sends a subscription update response message to NF service consumer 200 indicating that the subscription update was successful. Thus, lines 1, 2a, 3a, and 4a in FIG. 6 illustrate the successful use of the zero event notification procedure as part of a subscription update to verify a callback URI presented in a subscription update request and to verify connectivity from an NF service producer to an NF service consumer.

Referring to step 2B in FIG. 6, if NF service producer 202 is unable to send the zero event notification request, control proceeds to step 3b where NF service consumer 200 sends a zero event notification response failure message to NF service producer 202. Control then proceeds to step 4b where NF service producer 202 sends a subscription update failure message to NF service consumer 200. Control then proceeds to step 5 where NF service consumer 200 retries the subscription update request after fixing the root cause for the previous subscription update failure. In step 6, NF service producer 202 sends a zero event notification request message to NF service consumer 200. In step 7, NF service consumer 200 sends a zero event notification response message indicating successful receipt of the zero event notification request message. In response to receiving the zero event notification response message, in line 8, NF service producer 202 sends a subscription update response message to NF service consumer 200 indicating successful updating of the subscription.

Referring to line 3b in FIG. 6, if NF service consumer 200 receives the zero event notification request message and is unable to respond, control proceeds to step 4b where NF service producer 202 sends a subscription update failure message to consumer NF 200. Consumer NF 200 may then perform steps 5-8 of retrying the subscription update and the zero event notification procedures. Thus, FIG. 6 illustrates the use of the zero event notification procedure as part of a subscription update process to verify a callback URI in a subscription update request message and connectivity from the producer NF to the consumer NF.

Figure 7:
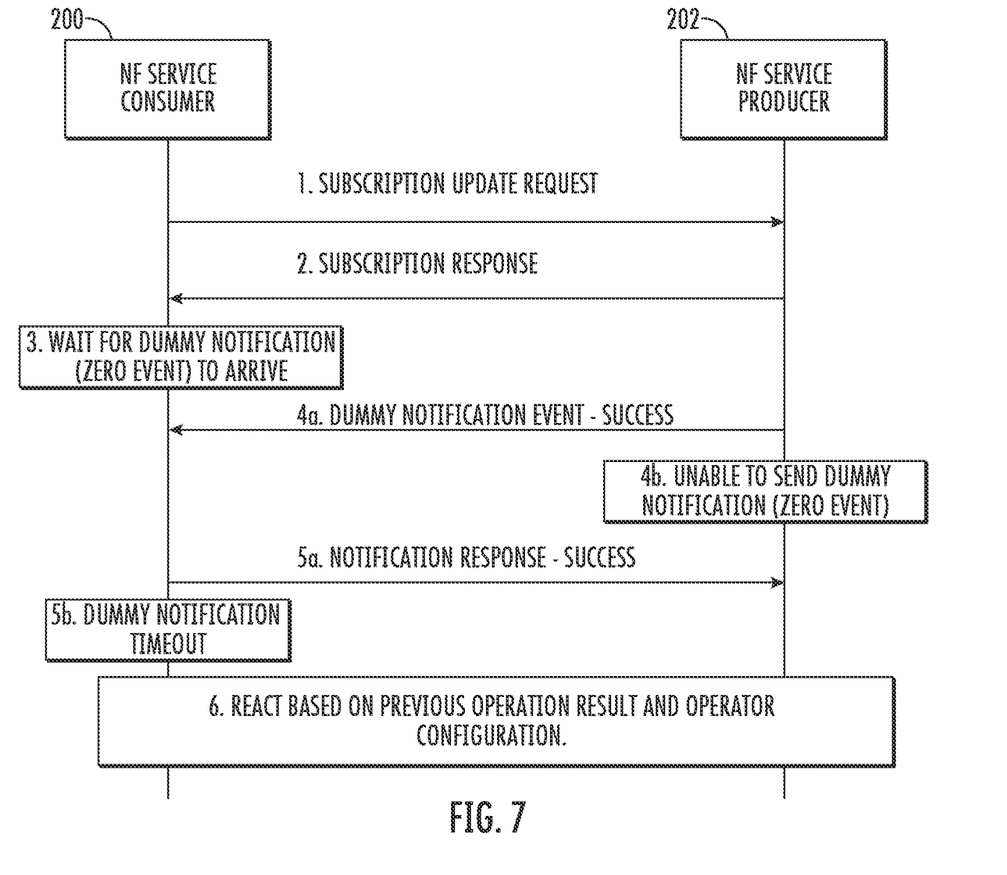
FIG. 7 is a message flow diagram illustrating exemplary messages exchanged for zero event notification after a subscription update.

In an alternate implementation of the subject matter described herein, the zero event notification procedure may be performed after a subscription update. This implementation is illustrated in FIG. 7. Referring to FIG. 7, in line 1, NF service consumer 200 sends a subscription update request to NF service producer 202. The subscription update request includes a parameter that indicates an intent to use the zero event notification procedure after the subscription update procedure is completed. In line 2 of the message flow diagram, NF service producer 202 responds to the subscription update request. In step 3, NF service consumer 200 waits for the zero event notification request from NF service producer 202. In line 4a, NF service producer 202 sends the zero event notification request to NF service consumer 200 using the callback URI in the subscription update request message. If the zero event notification request message is received by consumer NF 200 within the configured timeout period, control proceeds to step 5a where consumer NF 200 sends a zero event notification response message to producer NF 202 indicating successful completion of the zero event notification procedure. After successful receipt of the zero event notification response message, producer NF 202 can continue communicating with consumer NF 200 using subscribe/notify communications. with a high degree of confidence that the notification messages will be received.

Returning to step 3 in FIG. 7, if the zero event notification request message does not arrive within the configured time period at NF service consumer 200, for example, because the message is lost in transit, as indicated in step 4b, because NF service producer 202 is unable to send the zero event notification request message, or because NF service producer 202 sends the zero event notification request message to an invalid callback URI, control proceeds to step 5b where the dummy or zero event notification timeout occurs. In response to the dummy or zero event notification timeout, NF service consumer 200 sends a zero event notification response message indicating failure of the zero event notification procedure. Control then proceeds to step 6 where NF service consumer 200 and NF service producer 202 react based on the operation result and operator configuration. For example, NF service producer 202 and NF service consumer 200 may attempt to repeat the zero event notification procedure and/or the subscription update procedure (e.g., using a different callback URI).

Figure 8:
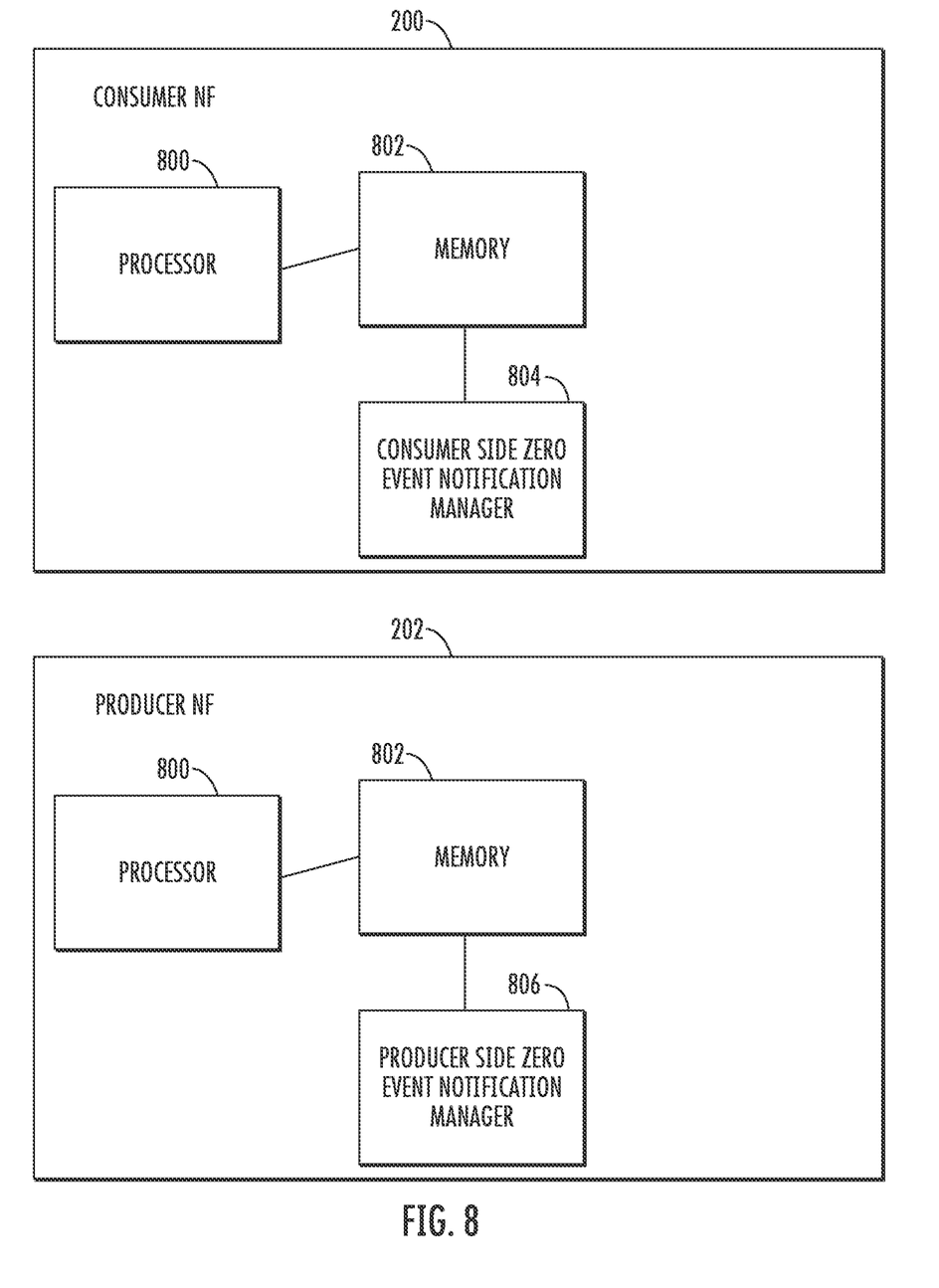
FIG. 8 is a block diagram illustrating an exemplary architecture for a consumer NF and a producer NF for performing zero event notification.

FIG. 8 is a block diagram illustrating an exemplary architecture for consumer NF 200 and producer NF 202 for implementing zero event notification as described herein. Referring to FIG. 8, consumer NF 200 and producer NF 202 each include at least one processor 800 and memory 802. Consumer NF 200 includes a consumer side zero event notification manager 804 for performing consumer side zero event notification processing. For example, consumer side zero event notification manager 804 may generate the parameter that is included in a header of an HTTP subscription request or subscription update request to indicate the intent to participate in the zero event notification procedure and when the procedure will be performed. Consumer side zero event notification manager 804 may also generate zero event notification response messages for the different scenarios illustrated in FIGS. 4-7. Consumer side zero event notification manager 804 may also keep the requisite timers for waiting for zero event notification request messages from NF service producer 202.

Producer NF 202 includes producer side zero event notification manager 806. Producer side zero event notification manager 806 performs producer side zero event notification processing. Such processing or operations include processing the header parameter received from NF service consumer 200 indicating the intent to participate in the zero event notification procedure and implementing the zero event notification procedure at the requested time, e.g., as part of subscription creation, after subscription creation, as part of subscription updating, or after subscription updating. Producer side zero event notification manager 806 may also generate zero event notification request messages and process zero event notification response messages to implement the scenarios illustrated in FIGS. 4-7.

Figure 9:
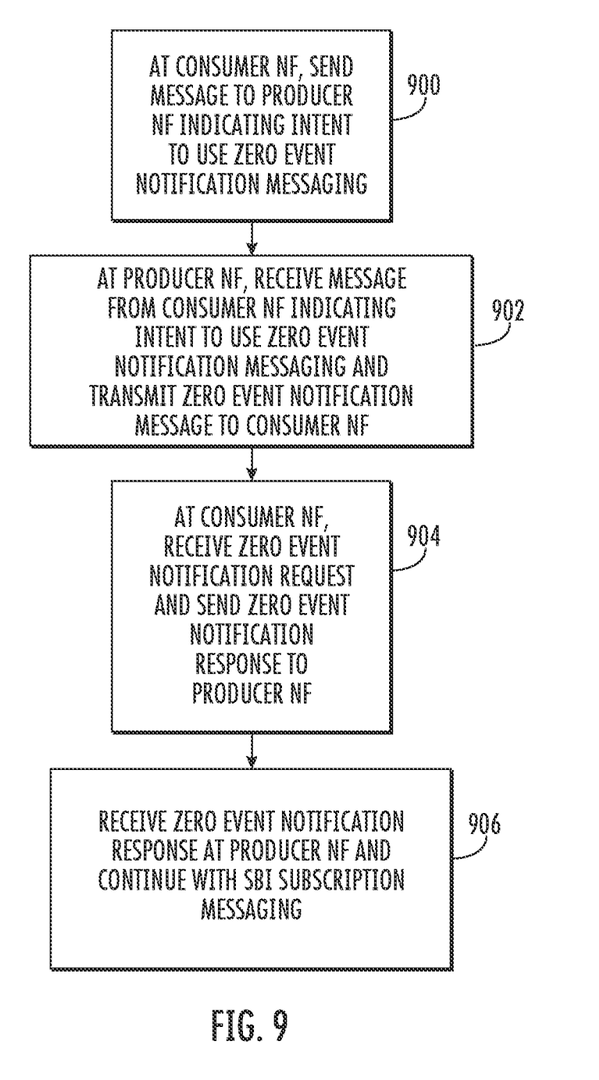
FIG. 9 is a flow chart illustrating an exemplary process for improved SBI message transport using zero event notification.

FIG. 9 is a flow chart illustrating an exemplary process for reliable SBI message transport using zero event notifications. Referring to FIG. 9, in step 900, the process includes, at a consumer NF, sending an SBI message to a producer NF indicating an intent to use zero intent zero event notification messaging. For example, a NF service consumer, such as NF service consumer 200 may send a subscription creation message or a subscription update message that includes an HTTP header with a parameter that indicates an intent to use zero event notification messaging. The header may also indicate the timing of using the zero event notification messaging. Example timings include using the zero event notification procedure as part of subscription creation, after subscription creation, as part of subscription updating, or after subscription updating.

In step 902, the process includes, at the producer NF, receiving the SBI message indicating the intent to use zero event notification messaging and transmitting a zero event notification request message to the consumer NF using the callback URI in the zero event notification request message to verify the callback URI and connectivity from the producer NF to the consumer NF. For example, an NF service producer, such as producer NF 202 may generate a zero event notification request message and send the message to NF service consumer 200 at the timing specified by the parameter in the SBI message.

In step 904, the process includes, at the NF service consumer, receiving the zero event notification request message and, in, response, sending a zero event notification response message to the producer NF. For example, consumer NF 200 may send a zero event notification response message to producer NF 202 indicating successful receipt of the zero event notification request message In step 906, the process includes, at the producer NF, receiving the zero event notification response message and, in response, continuing SBI subscription messaging with the consumer NF. For example, NF service producer 202 may continue creation of a subscription if the zero event notification message exchange occurs as part of the subscription creation process. If the zero event notification message exchange occurs after the subscription creation process, NF service producer 202 may start or continue to send notifications to NF service consumer 200 when a triggering event associated with the subscription occurs. If the zero event notification message exchange is implemented during the subscription update process, NF service producer 202 may continue the subscription update messaging by sending a successful subscription update response message to NF service consumer 200. If the zero event notification message exchange is implemented after the subscription update process, NF service producer 202 may start or continue to send notifications to NF service consumer 200 using the updated subscription information.

Advantages of the subject matter described herein include increased reliability of communications on the SBI interface for subscription related messaging. The zero event notification procedure may be applicable to both intra- and inter-PLMN messages. The zero event notification procedure may be implemented between any pair of consumer and producer NFs to increase reliability of subscribe/notify communications. Examples of producer and consumer NFs that may implement the subject matter described herein include the NRF, the PCF, the binding support function (BSF), the NSSF, the user data repository (URD), the UDM, and the NEF.

The disclosure of each of the following references is hereby incorporated herein by reference in its entirety.

REFERENCES 1. 3GPP TS 23.501 V16.7.0 (2020-12) 3rd Generation Partnership Project; Technical Specification Group Services and System Aspects; System Architecture for the 5G System (5GS); Stage 2 (Release 16).
2. 3GPP TS 23.502 V16.7.1 (2021-01), 3rd Generation Partnership Project; Technical Specification Group Services and System Aspects; Procedures for the 5G System (5GS); Stage 2 (Release 16).

3. 3GPP TS 29.501 V17.0.0 (2020-12) 3rd Generation Partnership Project; Technical Specification Group Core Network and Terminals; 5G System; Principles and Guidelines for Services Definition; Stage 3 (Release 17).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing for reliable service based interface (SBI) message transport using zero event notifications, the method comprising:
   at a consumer NF, sending an SBI message to a producer NF indicating an intent to use zero event notification messaging, wherein zero event notification messaging comprises an exchange of a dummy notification request message that does not correspond to a notification event and a dummy notification response message to verify a callback uniform resource identifier (URI) of the consumer NF and that connectivity to the consumer NF is available;
   at the producer NF, receiving the SBI message indicating the intent to use zero event notification messaging, and, transmitting a zero event notification request message to the consumer NF using a callback URI from the SBI message to confirm the callback URI and connectivity from the producer NF to the consumer NF, wherein the zero event notification request message comprises a dummy notification request message that is not triggered by a notification event and is used by the producer NF to verify that the callback URI in the SBI message is valid and that connectivity with the consumer NF is available;
   at the consumer NF, receiving the zero event notification request message and, in response, sending a zero event notification response message to the producer NF, wherein the zero event notification response message comprises a dummy notification response message to verify that the callback URI in the SBI message is and that connectivity with the consumer NF is available; and
   at the producer NF, receiving the zero event notification response message, determining that the callback URI in the SBI message is valid and that connectivity with the consumer NF is available, and, in response, continuing SBI subscription messaging with the consumer NF.

2. The method of claim 1 wherein sending the SBI message indicating an intent to use zero event notification messaging includes transmitting a hypertext transfer protocol (HTTP) message to the producer NF and including a parameter in a header of the HTTP message that indicates the intent to use zero event notification messaging and a timing as to when to use the zero event notification messaging.

3. The method of claim 2 wherein the HTTP header indicates that the zero event notification messaging will be during or after subscription creation.

4. The method of claim 1 wherein transmitting the zero event notification request message includes transmitting the zero event notification request message as a part of creation of a subscription.

5. The method of claim 4 wherein transmitting the zero event notification request message as part of creation of a subscription includes transmitting the zero event notification request message after receiving a subscription request from the consumer NF and wherein continuing the SBI subscription messaging with the consumer NF includes transmitting a subscription response to the consumer NF indicating successful creation of a subscription.

6. The method of claim 1 wherein transmitting the zero event notification request message includes transmitting the zero event notification request message after creation of a subscription.

7. The method of claim 6 wherein transmitting the zero event notification request message after creation of a subscription includes transmitting the zero event notification request message after transmitting a subscription response message to the consumer NF indicating successful creation of the subscription.

8. The method of claim 1 wherein transmitting the zero event notification request message includes transmitting the zero event notification request message as part of updating a subscription.

9. The method of claim 1 wherein transmitting the zero event notification request message includes transmitting the zero event notification request message after updating a subscription.

10. A system for providing for reliable service based interface (SBI) message transport using zero event notifications, the system comprising:
    a consumer NF including at least one processor and a memory for sending an SBI message indicating an intent to use zero event notification messaging, wherein zero event notification messaging is an exchange of a dummy notification request message that does not correspond to a notification event and a dummy notification response message to verify a callback uniform resource identifier (URI) of the consumer NF and that connectivity to the consumer NF is available; and
    a producer NF including at least one processor and a memory for receiving the SBI message indicating the intent to use zero event notification messaging, and, in response, for transmitting a zero event notification request message to the consumer NF using a callback uniform resource identifier URI from the SBI message to confirm the callback URI and connectivity from the producer NF to the consumer NF, wherein:
    the zero event notification request message comprises a dummy notification request message that is not triggered by a notification event and is used by the producer NF to verify that the callback URI in the SBI message is valid and that connectivity with the consumer NF is available;
    the consumer NF is configured to receive the zero event notification request message and, in response, send a zero event notification response message to the producer NF, wherein the zero event notification response message comprises a dummy notification response message to verify that the callback URI in the SBI message is and that connectivity with the consumer NF is available to verify that the callback URI in the SBI message is and that connectivity with the consumer NF is available; and
    the producer NF is configured to receive the zero event notification response message, determining that the callback URI in the SBI message is valid and that connectivity with the consumer NF is available, and, in response, continue with SBI subscription messaging with the consumer NF.

11. The system of claim 10 wherein the consumer NF is configured to send the SBI message indicating an intent to use zero event notification messaging by transmitting a hypertext transfer protocol (HTTP) message to the producer NF and including a parameter in a header of the HTTP message that indicates the intent to use zero event notification messaging and a timing as to when to use the zero event notification messaging.

12. The system of claim 11 wherein the HTTP header indicates that the zero event notification messaging will be during or after subscription creation.

13. The system of claim 10 wherein the producer NF is configured to transmit the zero event notification request message as a part of creation of a subscription.

14. The system of claim 13 wherein the producer NF is configured to transmit the zero event notification request message after receiving a subscription request from the consumer NF and to continue the SBI subscription messaging with the consumer NF by transmitting a subscription response to the consumer NF indicating successful creation of a subscription.

15. The system of claim 10 wherein the producer NF is configured to transmit the zero event notification request message after transmitting a subscription response message to the consumer NF indicating successful creation of the subscription.

16. The system of claim 10 wherein the producer NF is configured to transmit the zero event notification request message as part of updating a subscription.

17. The system of claim 10 wherein the producer NF is configured to transmit the zero event notification request message after updating a subscription.

18. A non-transitory computer readable medium having stored thereon executable instructions that when executed by a processor of a computer control the computer to perform steps comprising:

at a consumer network function (NF), sending a service based interface (SBI) message to a producer NF indicating an intent to use zero event notification messaging, wherein zero event notification messaging is an exchange of a dummy notification request message that does not correspond to a notification event and a dummy notification response message to verify a callback uniform resource identifier (URI) of the consumer NF and that connectivity to the consumer NF is available;

at the producer NF, receiving the SBI message indicating the intent to use zero event notification messaging, and, transmitting a zero event notification request message to the consumer NF using a callback URI from the SBI message to confirm the callback URI and connectivity from the producer NF to the consumer NF, wherein the zero event notification request message comprises a dummy notification request message that is not triggered by a notification event and is used by the producer NF to verify that the callback URI in the SBI message is valid and that connectivity with the consumer NF is available;

at the consumer NF, receiving the zero event notification request message and, in response, sending a zero event notification response message to the producer NF, wherein the zero event notification response message comprises a dummy notification response message to verify that the callback URI in the SBI message is and that connectivity with the consumer NF is available; and at the producer NF, receiving the zero event notification response message, determining that the callback URI in the SBI message is valid and that connectivity with the consumer NF is available, and, in response, continuing SBI subscription messaging with the consumer NF.

* * * * *

UNITED STATES PATENT AND TRADEMARK OFFICE
CERTIFICATE OF CORRECTION

PATENT NO. : 11,528,338 B2
APPLICATION NO. : 17/192790
DATED : December 13, 2022
INVENTOR(S) : Rajput et al.

It is certified that error appears in the above-identified patent and that said Letters Patent is hereby corrected as shown below:

In the Drawings

On sheet 4 of 9, in FIG. 4, Line 12, delete "SUBSCRITPION" and insert -- SUBSCRIPTION --, therefor.

On sheet 6 of 9, in FIG. 6, Line 12, delete "SUBSCRITPION" and insert -- SUBSCRIPTION --, therefor.

In the Specification

In Column 12, Line 22, delete "message" and insert -- message. --, therefor.

In the Claims

In Column 14, Line 41, in Claim 10, before "URI" delete "uniform resource identifier", therefor.

Signed and Sealed this
Eighth Day of August, 2023

Katherine Kelly Vidal
*Director of the United States Patent and Trademark Office*